US010434403B2

United States Patent
Weng et al.

(10) Patent No.: US 10,434,403 B2
(45) Date of Patent: Oct. 8, 2019

(54) INFORMATION PROCESSING METHOD, TERMINAL, AND COMPUTER STORAGE MEDIUM

(71) Applicant: Tencent Technology (Shenzhen) Company Limited, Shenzhen (CN)

(72) Inventors: Jianmiao Weng, Shenzhen (CN); Yong Tang, Shenzhen (CN); Wei Gong, Shenzhen (CN); Yu Chen, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 15/725,132

(22) Filed: Oct. 4, 2017

(65) Prior Publication Data

US 2018/0028907 A1 Feb. 1, 2018

Related U.S. Application Data

(63) Continuation-in-part of application No. PCT/CN2016/082405, filed on May 17, 2016.

(30) Foreign Application Priority Data

Sep. 29, 2015 (CN) .......................... 2015 1 0633378

(51) Int. Cl.
*A63F 9/24* (2006.01)
*A63F 13/2145* (2014.01)
(Continued)

(52) U.S. Cl.
CPC ........ *A63F 13/2145* (2014.09); *A63F 13/215* (2014.09); *A63F 13/54* (2014.09);
(Continued)

(58) Field of Classification Search
CPC .... A63F 13/2145; A63F 13/87; A63F 13/335; A63F 13/215; A63F 2300/308; G06F 3/04842; G06F 3/04883; G06F 3/0482
See application file for complete search history.

(56) References Cited

U.S. PATENT DOCUMENTS 8,082,499 B2 * 12/2011 Hudson ................... A63F 13/10
715/702
2005/0028110 A1 * 2/2005 Vienneau ............ G06F 3/04845
715/834
(Continued)

FOREIGN PATENT DOCUMENTS

CN 1714899 A 1/2006
CN 103190124 A 7/2013
(Continued)

OTHER PUBLICATIONS

Dota 2. Wikipedia.org. Online. Accessed via the Internet. Accessed Nov. 23, 2018. <URL: https://en.wikipedia.org/wiki/Dota_2>.*
(Continued)

*Primary Examiner* — Dmitry Suhol
*Assistant Examiner* — Carl V Larsen
(74) *Attorney, Agent, or Firm* — Morgan, Lewis & Bockius LLP

(57) ABSTRACT

The present disclosure discloses an information processing method performed at a terminal including: rendering a graphical user interface of an online game system, the graphical user interface including one or more virtual characters and at least one virtual resource object; detecting a touch operation on a specific virtual resource object; identifying a configuration parameter corresponding to the specific virtual resource object, the configuration parameter including multiple preconfigured operation objects, each preconfigured operation object having an associated message; rendering, within the graphical user interface, an (Continued)

information interface with the preconfigured operation objects located near the specific virtual resource object; detecting a release operation on the specific virtual resource object when one operation object is rendered visually distinguishable over other operation objects in the graphical user interface; and transmitting a message associated with the visually distinguishable operation object to terminals corresponding to one or more virtual characters of the online game system.

15 Claims, 10 Drawing Sheets

(51) Int. Cl.
| | |
|---|---|
| A63F 13/215 | (2014.01) |
| A63F 13/87 | (2014.01) |
| G06F 3/0488 | (2013.01) |
| G06F 3/0484 | (2013.01) |
| A63F 13/54 | (2014.01) |
| A63F 13/335 | (2014.01) |
| G06F 3/0482 | (2013.01) |

(52) U.S. Cl.
CPC .......... *A63F 13/87* (2014.09); *G06F 3/04842* (2013.01); *G06F 3/04883* (2013.01); *A63F 13/335* (2014.09); *A63F 2300/308* (2013.01); *G06F 3/0482* (2013.01)

(56) References Cited

U.S. PATENT DOCUMENTS

| | | | |
|---|---|---|---|
| 2006/0040740 A1* | 2/2006 | DiDato | A63F 13/06 463/37 |
| 2009/0203408 A1* | 8/2009 | Athas | G06F 1/1626 455/566 |
| 2017/0337742 A1* | 11/2017 | Powderly | G02B 27/017 |

FOREIGN PATENT DOCUMENTS

| | | |
|---|---|---|
| CN | 104065816 A | 9/2014 |
| CN | 104252291 A | 12/2014 |
| CN | 105094345 A | 11/2015 |

OTHER PUBLICATIONS

Chat Wheel. dota2.gamepedia.org. Online. Aug. 10, 2014. Accessed via the Internet. Accessed Nov. 23, 2018. <URL: https://web.archive.org/web/20140810071729/http://dota2.gamepedia.com/Chat_Wheel>.*

Wingfield, Nick. Vainglory Breaks Through in E-Sports on a Tablet. Online. Aug. 9, 2015. Accessed via the Internet. Accessed Nov. 23, 2018. <URL: https://bits.blogs.nytimes.com/2015/08/09/vainglory-breaks-through-in-e-sports-on-a-tablet/>.*

Dota 2 Chat Wheel Feature. Youtube.com. Online. Nov. 14, 2012. Accessed via the Internet. Accessed Nov. 23, 2018. <URL: https://www.youtube.com/watch?v=2WloHf5bz7U>.*

Tencent Technology, ISR, PCT/CN2016/082405, dated Jul. 26, 2016, 3 pgs.

* cited by examiner

| Content of shortcut information | Icon of shortcut information |
|---|---|
| Destroy the tower |  |
| Fight dragons |  |
| Go Baron |  |
| Team fight |  |
| Keep the highlands |  |
| Go to the highlands |  |
| Missing |  |
| Back |  |
| Careful of bush |  |

Table 1

INFORMATION PROCESSING METHOD, TERMINAL, AND COMPUTER STORAGE MEDIUM

PRIORITY CLAIM AND RELATED APPLICATION

This application is a continuation-in-part application of PCT/CN2016/082405, entitled "INFORMATION PROCESSING METHOD, TERMINAL, AND COMPUTER STORAGE MEDIUM" filed on May 17, 2016, which claims priority to Chinese Patent Application No. 201510633378.X, filed with the State Intellectual Property Office of the People's Republic of China on Sep. 29, 2015, and entitled "INFORMATION PROCESSING METHOD, TERMINAL, AND COMPUTER STORAGE MEDIUM", both of which are incorporated herein by reference in their entirety.

FIELD OF THE TECHNOLOGY

The present disclosure relates to information exchange technologies, and in particular, to an information processing method, a terminal, and a computer storage medium.

BACKGROUND OF THE DISCLOSURE

With gradual popularization of large-screen and super-screen intelligent terminals, a processor of an intelligent terminal has an increasingly high processing capability, so that many applications that implement control based on man-machine interaction appear on a large screen or a super screen. In a process of implementing control based on man-machine interaction, multiple users may run different interaction modes by creating groups in one-to-one, one-to-many, and many-to-many forms, to obtain different interaction results. For example, in a graphical user interface obtained through rendering on a large screen or a super screen, after multiple users are grouped into two different groups, by means of control processing in man-machine interaction, information exchange may be performed between the different groups, and different interaction results are obtained according to a response to information exchange; and by means of control processing in man-machine interaction, information exchange may further be performed between group members in a same group, and different interaction results are obtained according to a response to information exchange.

In the existing technology, in an information exchange process, information exchange is performed in a text form or information exchange is performed in a voice form. For the two forms, it needs to take time to edit text or voice content additionally. Consequently, requirements for real-time performance and rapidness of information exchange cannot be met. However, in related technologies, there is still no effective solution to the foregoing problem.

SUMMARY

In view of this, embodiments of the present disclosure expect to provide an information processing method, a terminal, and a computer storage medium, so as to at least resolve a problem in the existing technology, so that information can be sent in real time and rapidly, thereby meeting requirements for real-time performance and rapidness of information exchange.

An embodiment of the present disclosure provides an information processing method performed at a terminal having one or more processors and memory storing one or more programs to be executed by the one or more processors, the method comprising:

rendering a graphical user interface of an online game system, the graphical user interface including one or more virtual characters and at least one virtual resource object;

detecting a touch operation on a specific virtual resource object;

identifying a configuration parameter corresponding to the specific virtual resource object, the configuration parameter including multiple preconfigured operation objects, each preconfigured operation object having an associated message;

rendering, within the graphical user interface, an information interface with the preconfigured operation objects located near the specific virtual resource object;

detecting a release operation on the specific virtual resource object when one operation object is rendered visually distinguishable over other operation objects in the graphical user interface; and transmitting a message associated with the visually distinguishable operation object to terminals corresponding to one or more virtual characters of the online game system.

An embodiment of the present disclosure provides a terminal comprising one or more processors, memory and one or more programs stored in the memory that, when executed by the one or more processors, cause the terminal to perform the aforementioned information processing method.

An embodiment of the present disclosure provides a non-transitory computer readable storage medium storing one or more programs, wherein the one or more programs are configured to, when executed by one or more processors of a terminal, cause the terminal to perform the aforementioned information processing method.

DESCRIPTION OF EMBODIMENTS

Implementation of the technical solutions is further described in detail below with reference to the accompanying drawings.

Figure 1:
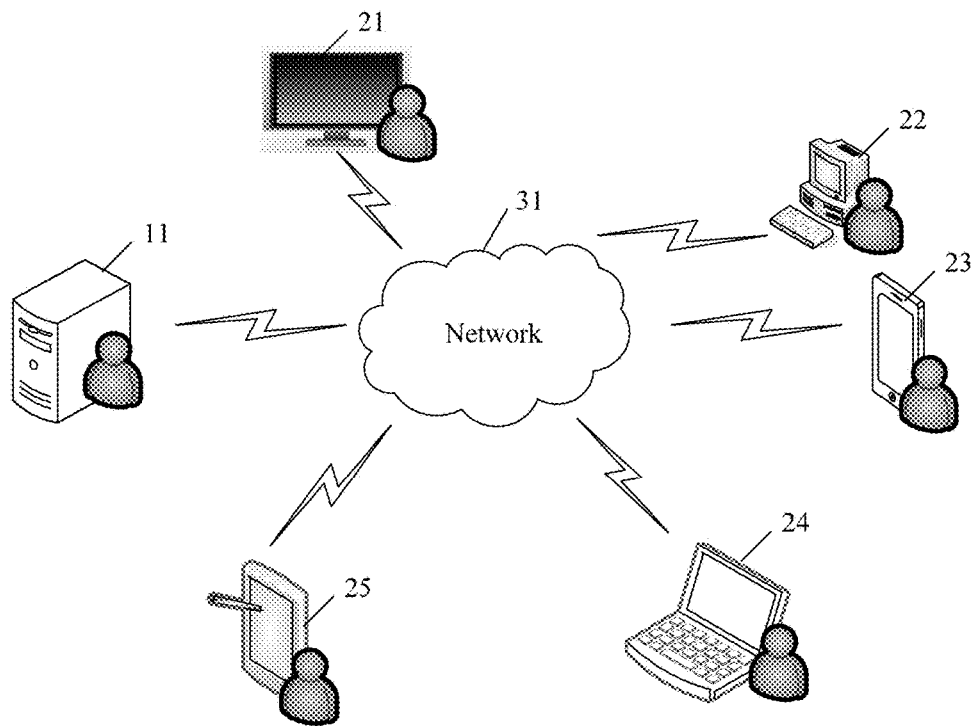
FIG. 1 is a schematic diagram of various hardware entities that perform information exchange according to an embodiment of the present disclosure.

FIG. 1 is a schematic diagram of various hardware entities that perform information exchange according to an embodiment of the present disclosure. FIG. 1 includes: one or more servers 11 to 1n, terminal devices 21 to 25, and a network 31. The network 31 includes network entities such as a router and a gateway, which are not shown in the figure. The terminal devices 21 to 25 perform information exchange with the server by using a wired network or a wireless network, so as to download an application and/or an application update data packet and/or application related data information or service information from the server 11. A type of the terminal device is shown in FIG. 1, and includes a mobile phone (the terminal 23), a tablet computer or a PDA (the terminal 25), a desktop computer (the terminal 22), a PC (the terminal 24), an all-in-one PC (the terminal 21), and other types. Various applications, for example, an application having an entertainment function (such as a video application, an audio play application, a game application, or reading software) or an application having a serving function (such as a map navigation application, or a group purchasing application), required by a user are installed in the terminal device.

Based on a system shown in FIG. 1, a game scene is used as an example. The terminal devices 21 to 25 download, by using the network 31, a game application and/or a game application update data packet and/or game application related data information or service information from the servers 11 to 1n according to a requirement. By means of embodiments of the present disclosure, after the game application is started on the terminal device and a game interface obtained through rendering is entered, when a touch operation on a specific virtual resource object in a game interface is detected, a configuration parameter corresponding to the specific virtual resource object may be invoked, rendering is performed according to the configuration parameter, to obtain an information interface including an information interface in a wheel form, a first object in at least one operation object in the information interface is selected by means of a touch operation or a slide operation, and instruction information in a voice and/or text form that corresponds to the first object is sent when a release operation is detected. Because preset instruction information is sent by means of man-machine interaction, and to send instruction information, it does not need to first take time to edit information content additionally, information can be sent in real time and rapidly, thereby meeting requirements for real-time performance and rapidness of information exchange.

The example in FIG. 1 is only an example of a system architecture for implementing the embodiments of the present disclosure, and the embodiments of the present disclosure are not limited to the system architecture in FIG. 1. Based on the system architecture, various embodiments of the present disclosure are provided.

Figure 2:
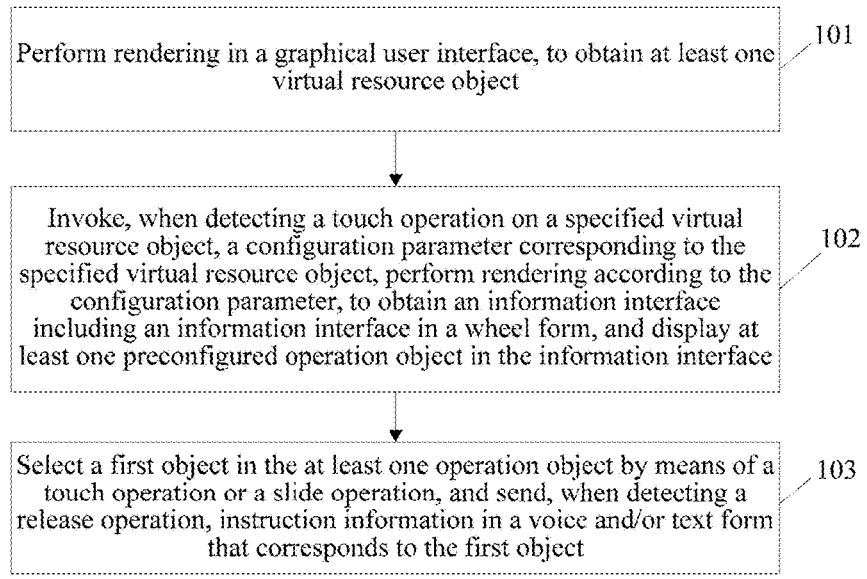
FIG. 2 is a schematic flowchart of implementation of some embodiments of the present disclosure.

This embodiment of the present disclosure provides an information processing method. A software application is executed on a processor of a terminal and rendering is performed on a display of the terminal, to obtain a graphical user interface. The processor, the graphical user interface, and the software application are implemented in a game system. As shown in FIG. 2, the method includes the following operations:

Operation 101: Perform rendering in the graphical user interface, to obtain at least one virtual resource object.

Herein, the virtual resource object is covered in various types of objects in the graphical user interface. For example, a user avatar icon for representing a user, an object for representing a building, a tree, tower defense, or the like in a background, an object for representing a status (such as a blood value or a vitality value) of the user, an object for representing a skill, equipment, or the like of the user, a direction button object for controlling a change of a location of the user, a rendering object used during skill release by the user, and the like shall all fall within the protection scope of the "virtual resource object" of the embodiments of the present disclosure.

In some embodiments, the graphical user interface also includes one or more virtual characters, each virtual character corresponding to a player of the online game system at a respective terminal. The virtual characters are divided into multiple groups playing against each other. The online game system communicates with each terminal to receive user instructions from the player and update the game scene rendered on the display of the terminal. In some embodiments, the online game system has a user profile for each player, the user profile including a current location of the terminal used by the player and one or more user preferences such as the type of messages (e.g., text or voice) the player prefers to receive from its groupmate when playing games.

Operation 102: Invoke, when detecting a touch operation on a specific virtual resource object, a configuration parameter corresponding to the specific virtual resource object, perform rendering according to the configuration parameter, to obtain an information interface including an information interface in a wheel form, and display at least one preconfigured operation object in the information interface.

Figure 3:
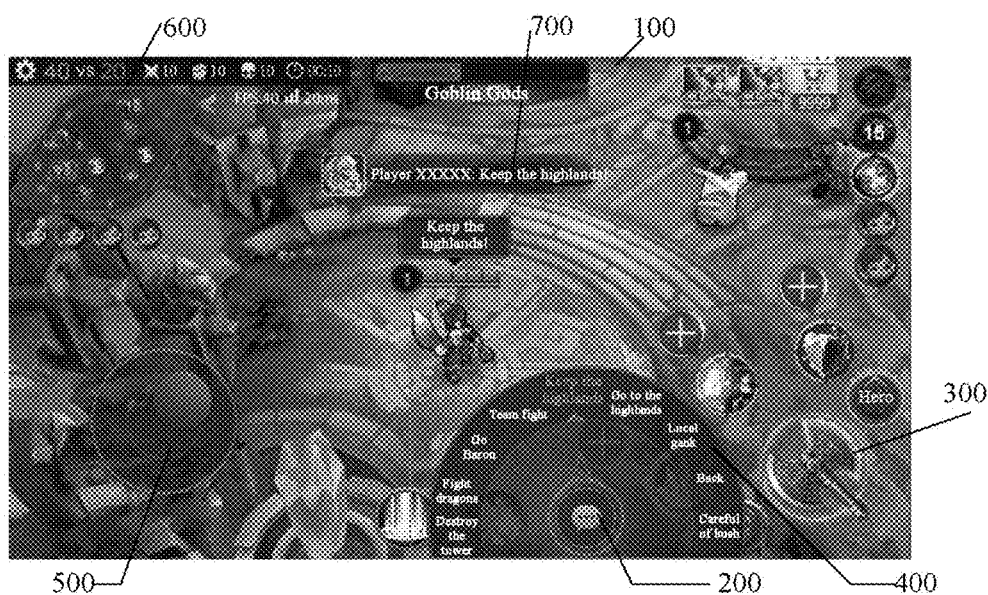
FIG. 3 to FIG. 6 are schematic diagrams of application of obtained user interaction interfaces (UI) according to embodiments of the present disclosure.

Herein, the specific virtual resource object is an object that can respond to a specified trigger operation, such as a direction button object, in the graphical user interface, for controlling a change of a location of a user. When the user touches the direction button object and drags the direction button object to move to the left, a related user correspondingly displayed in the graphical user interface moves to the left. In this embodiment of the present disclosure, the specific virtual resource object is shown by an SMS message object 200 in FIG. 3. FIG. 3 further includes: a graphical user interface 100, a skill object 300, a wheel information interface 400, a function key object 500 for controlling a user to move and launch attach, and a mini map object 600 that can enable a current user to view deployment and layout of two parties in a large map shown in the graphical user interface. The current user sends instruction information being "keep the highlands" to any group member that belongs to a group of the current user, a corresponding instruction information dialog box is 700, and the instruction information being "keep the highlands" can be learned by only members of our side and cannot be learned by enemy. The wheel information interface 400 may be of any form and is not limited to the wheel form shown in FIG. 3, as long as predefined shortcut instruction information can be presented in the information interface. When a touch operation on the specified SMS message object 200 in the graphical user interface 100 is detected, a configuration parameter corresponding to the SMS message object 200 is invoked, and the information interface is obtained through rendering according to the configuration parameter. At least one preconfigured operation object is displayed in the information interface, for example, including shortcut instruction information such as: destroy the tower, fight dragons, go Baron, team fight, keep the highlands, go to the highlands, missing, back, and careful of bush.

Figure 4:
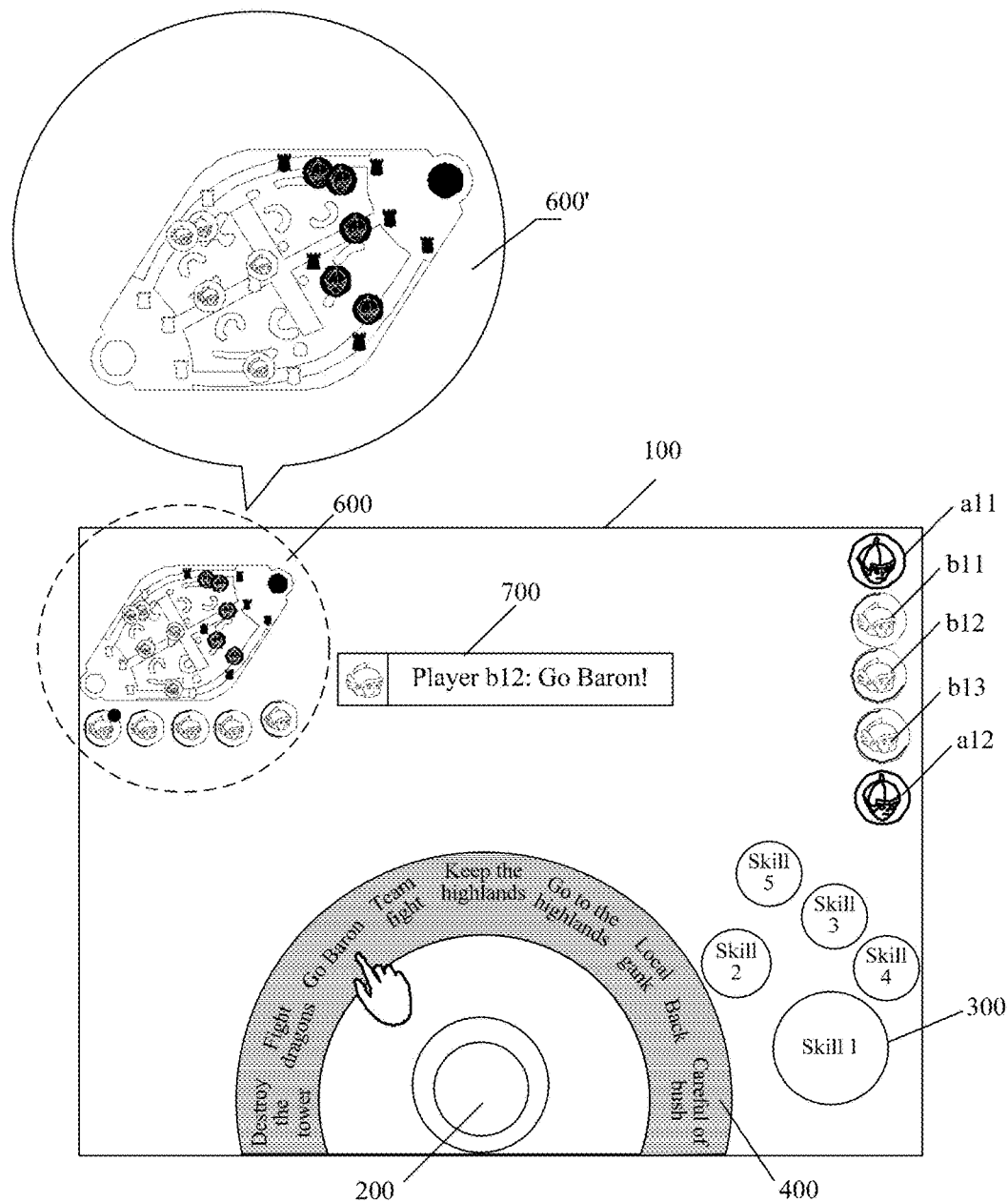
Figure 5:
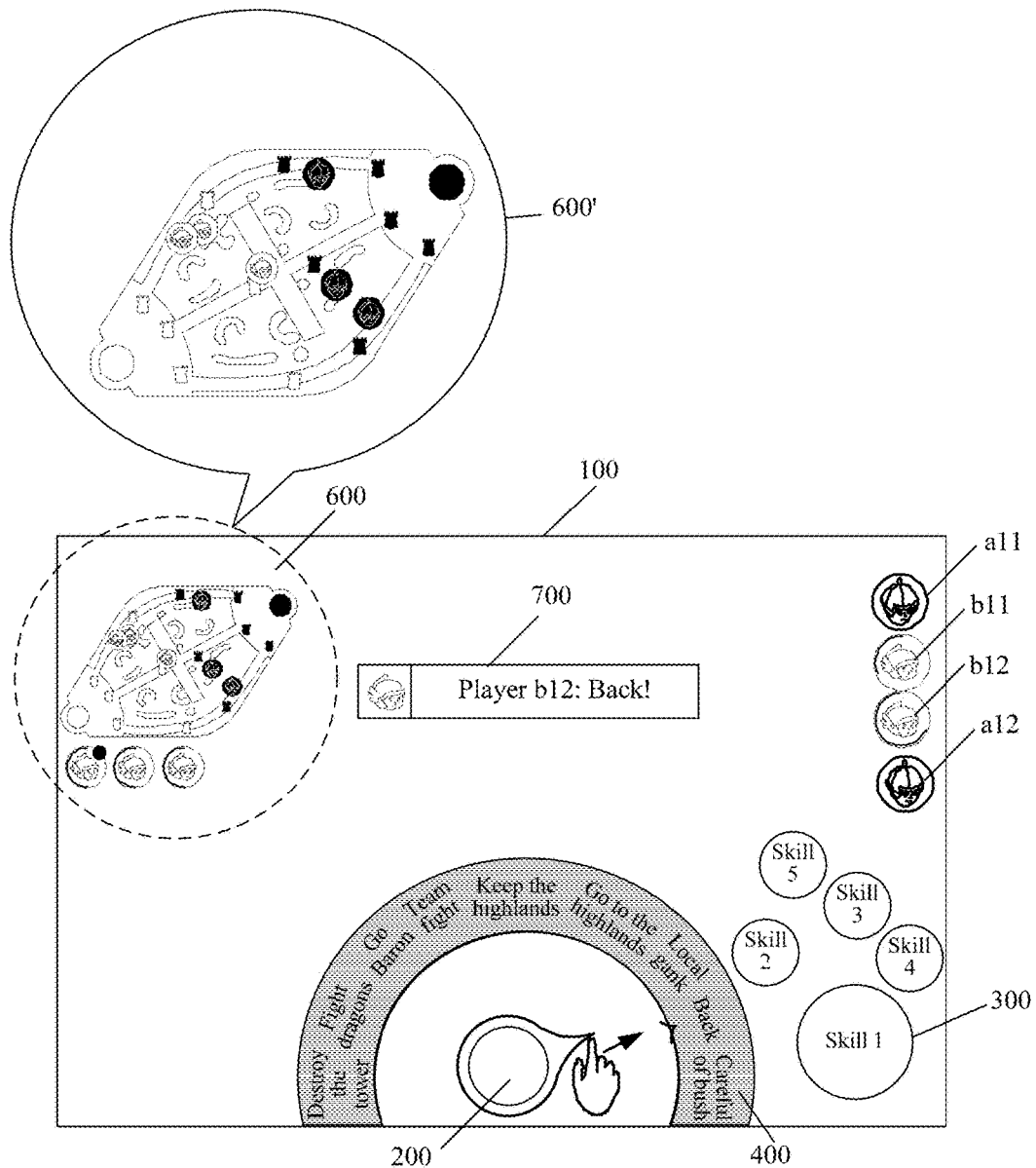
Figure 6:
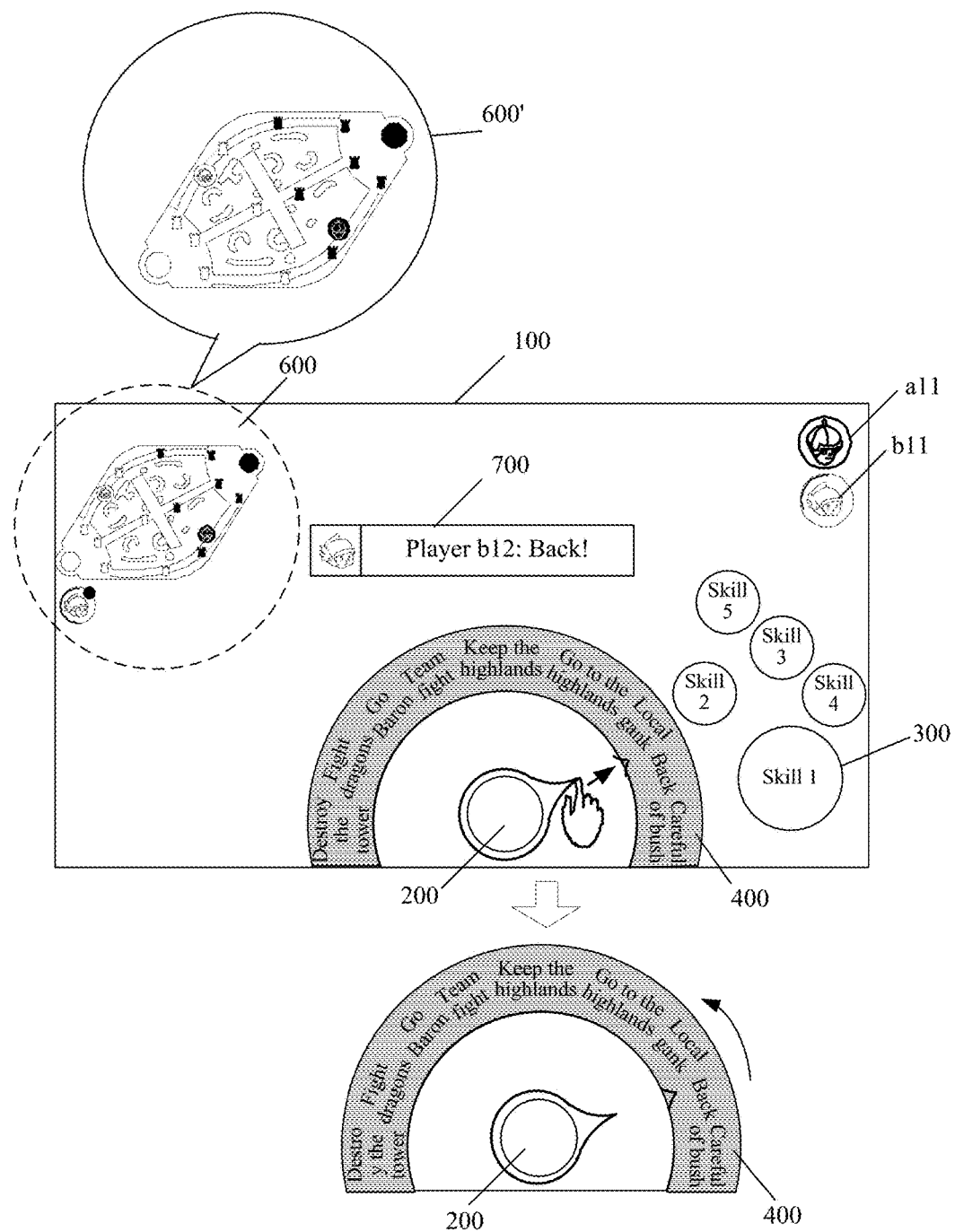

Herein, it should be noted that, a UI shown in FIG. 3 obtained through rendering by a processor of a terminal device, which is specifically an image processor is only a specific example. UIs shown in FIG. 4 to FIG. 6 are other examples. Different personnel deployment scenarios in a game are used for description, for example, numbers of deployed persons of two parties are 1 to 1, 3 to 3, or 5 to 5, and sent shortcut instruction information is also different. In addition, in FIG. 4 to FIG. 6, sending of instruction information is triggered in two manners: by means of a touch operation and by means of a slide operation. FIG. 4 is a schematic diagram of triggering sending of instruction information by means of a touch operation, FIG. 5 is a schematic diagram of triggering sending of instruction information by means of a slide operation, and FIG. 6 is a schematic diagram of triggering sending of instruction information by means of a slide operation and a correction manner. Details are not described herein, and details are provided subsequently.

In some embodiments, the configuration parameter includes multiple preconfigured operation objects, each preconfigured operation object having an associated message. An information interface is rendered, within the graphical user interface, with the preconfigured operation objects located near the specific virtual resource object.

Operation 103: Select a first object in the at least one operation object by means of a touch operation or a slide operation, and send, when detecting a release operation, instruction information in a voice and/or text form that corresponds to the first object.

In some embodiments, one of the preconfigured operation objects is rendered visually distinguishable over other operation objects in the graphical user interface. The terminal transmits a message associated with the visually distinguishable operation object to terminals corresponding to one or more virtual characters of the online game system in response to detecting a release operation on the specific virtual resource object. In some embodiments, the terminal also displays the message near the center of the graphical user interface for a predefined time period to confirm to the user of the terminal that the message has been sent out.

In some embodiments, the terminal selects one of the preconfigured operation objects as a recommended operation object in accordance with a current configuration of the one or more virtual characters by the online game system and renders the recommended operation object in a visually distinguishable manner over other operation objects in the graphical user interface. For example, based on the locations of the virtual characters in the graphical user interface and their relationship with one another (e.g., alliance or adversary), the terminal, by itself or working with the online game system, may choose one of the preconfigured operation objects to recommend to the user for consideration.

In some embodiments, the terminal has access to the user profiles of its groupmates at the online game system and then determines a type of messages before transmitting the message. For example, a player attending a conference or at a library may prefer to receive the message in text format while another user may prefer to receive the message in voice format. Therefore, the terminal may transmit a text version of the message to a first terminal according to the first terminal's user configuration at the online game system while transmitting a voice version of the message to a second terminal according to the second terminal's user configuration at the online game system.

Herein, a first scenario in which instruction information is triggered by means of a touch operation is as follows: In an example in operation 102, as shown in FIG. 3, in this embodiment of the present disclosure, the specific virtual resource object is the SMS message object 200, and when the touch operation on the specified SMS message object 200 in the graphical user interface 100 is detected, the configuration parameter corresponding to the SMS message object 200 is invoked, the wheel information interface 400 is obtained through rendering according to the configuration parameter, and display of the wheel information interface 400 is triggered. At least one configured operation object is displayed in advance in the information interface, for example, including the shortcut instruction information such as: destroy the tower, fight dragons, go Baron, team fight, keep the highlands, go to the highlands, missing, back, and careful of bush. Therefore, to send one piece of shortcut instruction information, the current user touches corresponding shortcut instruction information such as "go Baron" in the wheel information interface 400, a corresponding instruction information dialog box is 700, and the instruction information being "go Baron" can be learned by only members of our side and cannot be learned by enemy, as shown in FIG. 4.

After the shortcut instruction information is sent, instruction information being "go Baron" that is sent by the current user to any group member that belongs to the group of the current user is displayed in the graphical user interface 100, as shown in FIG. 4. FIG. 4 further includes an enlarged local view 600' corresponding to the mini map 600, layout of two parties in the game is displayed in the enlarged local view 600'. Currently, it is a deployment scenario in which numbers of deployed persons of two parties are 5 to 5, where the icons associated with labels "b11", "b12", and "b13" indicate a member of our side, and the icons associated with labels "a11" and "a12" indicate enemy.

Herein, a second scenario in which instruction information is triggered by means of a slide operation is as follows: In an example in operation 102, as shown in FIG. 3, in this embodiment of the present disclosure, the specific virtual resource object is the SMS message object 200, and when a slide operation on the specified SMS message object 200 in the graphical user interface 100 is detected, the configuration parameter corresponding to the SMS message object 200 is invoked, the wheel information interface 400 is obtained through rendering according to the configuration parameter, and display of the wheel information interface 400 is triggered. At least one configured operation object is displayed in advance in the information interface, for example, including the shortcut instruction information such as: destroy the tower, fight dragons, go Baron, team fight, keep the highlands, go to the highlands, missing, back, and careful of bush. Therefore, to send one piece of shortcut instruction information, the current user touches corresponding shortcut instruction information such as "back" in the wheel information interface 400, a corresponding instruction information dialog box is 700, and the instruction information being "back" can be learned by only members of our side and cannot be learned by enemy, as shown in FIG. 5.

After the shortcut instruction information is sent, instruction information being "back" that is sent by the current user to any group member that belongs to the group of the current user is displayed in the graphical user interface 100, as shown in FIG. 5. FIG. 5 further includes an enlarged local view 600' corresponding to the mini map 600, layout of two parties in the game is displayed in the enlarged local view 600'. Currently, it is a deployment scenario in which numbers of deployed persons of two parties are 3 to 3, where the icons associated with labels "b11" and "b12" indicate a member of our side, and the icons associated with labels "a11" and "a12" indicate enemy.

In an implementation of this embodiment of the present disclosure, as shown in FIG. 3, when the information interface is in the wheel form, the at least one operation object (such as the shortcut instruction information) in the wheel information interface 400 is distributed in an annular shape, and is set relative to the specific virtual resource object (such as the SMS message object) as a center. The at least one operation object includes preset text information or icon information (which is not displayed in FIG. 3, an icon of corresponding text information may be set, and the icon instead of current text information is displayed in the wheel information interface 400).

Figure 7:
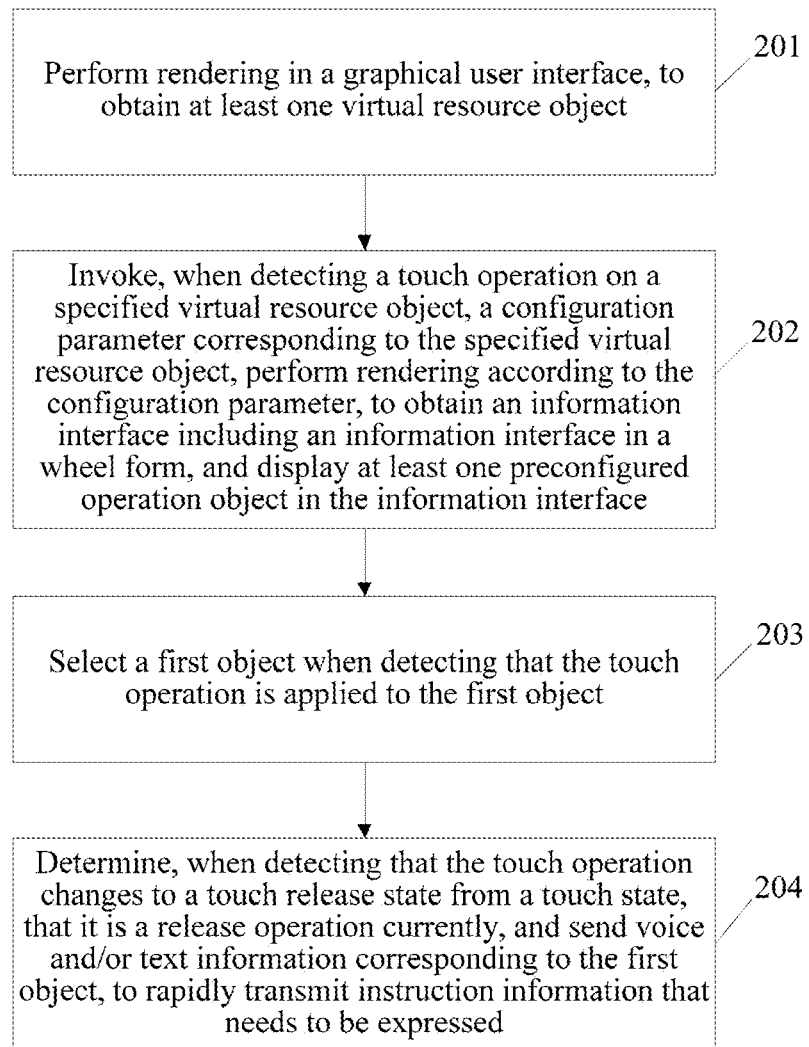
FIG. 7 is a schematic flowchart of implementation of some embodiments of the present disclosure.

This embodiment of the present disclosure provides an information processing method. A software application is executed on a processor of a terminal and rendering is performed on a display of the terminal, to obtain a graphical user interface. The processor, the graphical user interface, and the software application are implemented in a game system. As shown in FIG. 7, the method includes the following operations:

Operation 201: Perform rendering in the graphical user interface, to obtain at least one virtual resource object.

Herein, the virtual resource object is covered in various types of objects in the graphical user interface. For example, a user avatar icon for representing a user, an object for representing a building, a tree, tower defense, or the like in a background, an object for representing a status (such as a blood value or a vitality value) of the user, an object for representing a skill, equipment, or the like of the user, a direction button object for controlling a change of a location of the user, a rendering object used during skill release by the user, and the like shall all fall within the protection scope of the "virtual resource object" of the embodiments of the present disclosure.

Operation 202: Invoke, when detecting a touch operation on a specific virtual resource object, a configuration parameter corresponding to the specific virtual resource object, perform rendering according to the configuration parameter, to obtain an information interface including an information interface in a wheel form, and display at least one preconfigured operation object in the information interface.

Herein, the specific virtual resource object is an object that can respond to a specified trigger operation, such as a direction button object, in the graphical user interface, for controlling a change of a location of a user. When the user touches the direction button object and drags the direction button object to move to the left, a related user correspondingly displayed in the graphical user interface moves to the left. In this embodiment of the present disclosure, the specific virtual resource object is shown by an SMS message object 200 in FIG. 3. FIG. 3 further includes: a graphical user interface 100, a skill object 300, a wheel information interface 400, a function key object 500 for controlling a user to move and launch attach, and a mini map object 600 that can enable a current user to view deployment and layout of two parties in a large map shown in the graphical user interface. The current user sends instruction information being "keep the highlands" to any group member that belongs to a group of the current user, a corresponding instruction information dialog box is 700, and the instruction information being "keep the highlands" can be learned by only members of our side and cannot be learned by enemy. The wheel information interface 400 may be of any form and is not limited to the wheel form shown in FIG. 3, as long as predefined shortcut instruction information can be presented in the information interface. When a touch operation on the specified SMS message object 200 in the graphical user interface 100 is detected, a configuration parameter corresponding to the SMS message object 200 is invoked, and the information interface is obtained through rendering according to the configuration parameter. At least one preconfigured operation object is displayed in the information interface, for example, including shortcut instruction information such as: destroy the tower, fight dragons, go Baron, team fight, keep the highlands, go to the highlands, missing, back, and careful of bush.

Herein, it should be noted that, a UI shown in FIG. 3 obtained through rendering by a processor of a terminal device, which is specifically an image processor is only a specific example. UIs shown in FIG. 4 to FIG. 6 are other examples. Different personnel deployment scenarios in a game are used for description, for example, numbers of deployed persons of two parties are 1 to 1, 3 to 3, or 5 to 5, and sent shortcut instruction information is also different. In addition, in FIG. 4 to FIG. 6, sending of instruction information is triggered in two manners: by means of a touch operation and by means of a slide operation. FIG. 4 is a schematic diagram of triggering sending of instruction information by means of a touch operation, and FIG. 5 is a schematic diagram of triggering sending of instruction information by means of a slide operation. Details are not described herein, and details are provided subsequently.

Operation 203: Select a first object when detecting that the touch operation is applied to the first object.

Operation 204: Determine, when detecting that the touch operation changes to a touch release state from a touch state, that it is a release operation currently, and send voice and/or text information corresponding to the first object, to rapidly transmit instruction information that needs to be expressed.

By means of operation 203 and operation 204, corresponding shortcut instruction information in a text and/or voice form in the wheel information interface 400 shown in FIG. 3 may be rapidly sent by touching and holding an option and then releasing.

Specifically, as shown in FIG. 3, in this embodiment of the present disclosure, the specific virtual resource object is the SMS message object 200, and when the touch operation on the specified SMS message object 200 in the graphical user interface 100 is detected, the configuration parameter corresponding to the SMS message object 200 is invoked, the wheel information interface 400 is obtained through rendering according to the configuration parameter, and display of the wheel information interface 400 is triggered. At least one configured operation object is displayed in advance in the information interface, for example, including the shortcut instruction information such as: destroy the tower, fight dragons, go Baron, team fight, keep the highlands, go to the highlands, missing, back, and careful of bush. Therefore, to send one piece of shortcut instruction information, the current user touches corresponding shortcut instruction information such as "go Baron" in the wheel information interface 400, a corresponding instruction information dialog box is 700, and the instruction information being "go Baron" can be learned by only members of our side and cannot be learned by enemy, as shown in FIG. 4.

After the shortcut instruction information is sent, instruction information being "go Baron" that is sent by the current user to any group member that belongs to the group of the current user is displayed in the graphical user interface 100, as shown in FIG. 4. FIG. 4 further includes an enlarged local view 600' corresponding to the mini map 600, layout of two parties in the game is displayed in the enlarged local view 600'. Currently, it is a deployment scenario in which numbers of deployed persons of two parties are 5 to 5, where the icons associated with labels "b11", "b12", and "b13" indicate a member of our side, and the icons associated with labels "a11" and "a12" indicate enemy.

In an implementation of this embodiment of the present disclosure, as shown in FIG. 3, when the information interface is in the wheel form, the at least one operation object (such as the shortcut instruction information) in the wheel information interface 400 is distributed in an annular shape, and is set relative to the specific virtual resource object (such as the SMS message object) as a center. The at least one operation object includes preset text information or icon information (which is not displayed in FIG. 3, an icon of corresponding text information may be set, and the icon instead of current text information is displayed in the wheel information interface 400).

Figure 8:
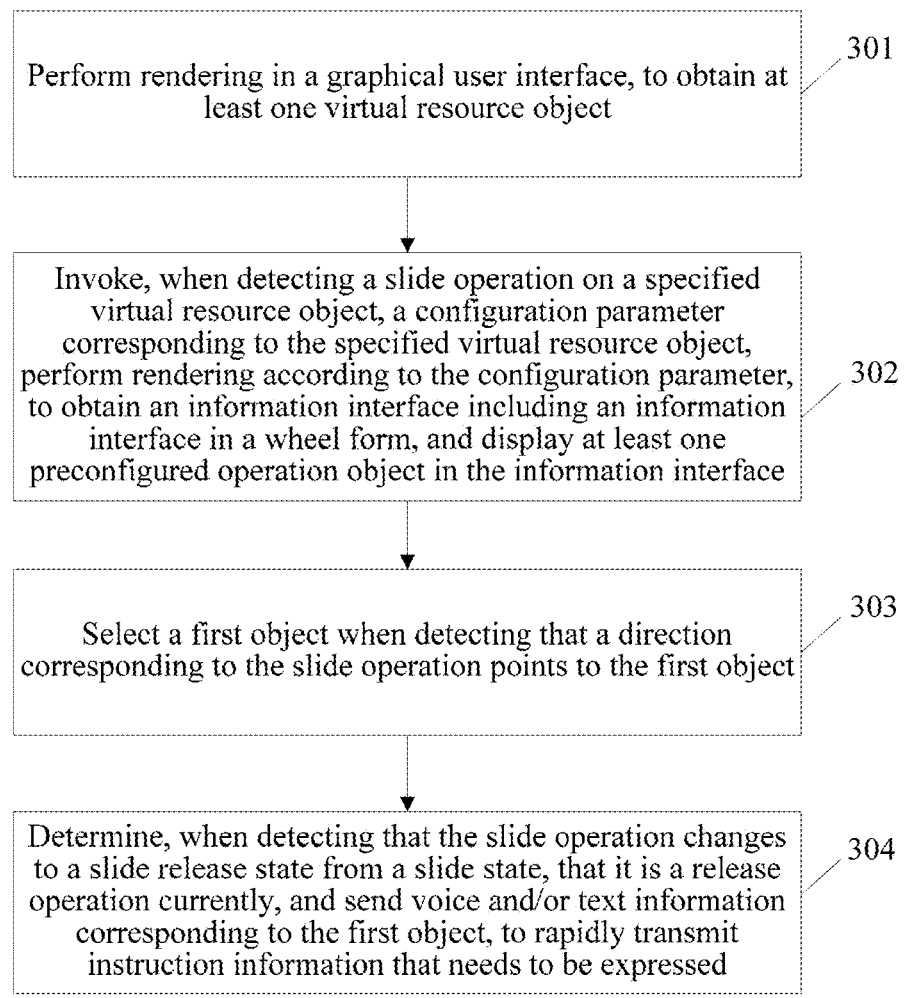
FIG. 8 is a schematic flowchart of implementation of some embodiments of the present disclosure.

This embodiment of the present disclosure provides an information processing method. A software application is executed on a processor of a terminal and rendering is performed on a display of the terminal, to obtain a graphical user interface. The processor, the graphical user interface, and the software application are implemented in a game system. As shown in FIG. 8, the method includes the following operations:

Operation 301: Perform rendering in the graphical user interface, to obtain at least one virtual resource object.

Herein, the virtual resource object is covered in various types of objects in the graphical user interface. For example, a user avatar icon for representing a user, an object for representing a building, a tree, tower defense, or the like in a background, an object for representing a status (such as a blood value or a vitality value) of the user, an object for representing a skill, equipment, or the like of the user, a direction button object for controlling a change of a location of the user, a rendering object used during skill release by the user, and the like shall all fall within the protection scope of the "virtual resource object" of the embodiments of the present disclosure.

Operation 302: Invoke, when detecting a slide operation on a specific virtual resource object, a configuration parameter corresponding to the specific virtual resource object, perform rendering according to the configuration parameter, to obtain an information interface including an information interface in a wheel form, and display at least one preconfigured operation object in the information interface.

Herein, the specific virtual resource object is an object that can respond to a specified trigger operation, such as a direction button object, in the graphical user interface, for controlling a change of a location of a user. When the user touches the direction button object and drags the direction button object to move to the left, a related user correspondingly displayed in the graphical user interface moves to the left. In this embodiment of the present disclosure, the specific virtual resource object is shown by an SMS message object 200 in FIG. 3. FIG. 3 further includes: a graphical user interface 100, a skill object 300, a wheel information interface 400, a function key object 500 for controlling a user to move and launch attach, and a mini map object 600 that can enable a current user to view deployment and layout of two parties in a large map shown in the graphical user interface. The current user sends instruction information being "keep the highlands" to any group member that belongs to a group of the current user, a corresponding instruction information dialog box is 700, and the instruction information being "keep the highlands" can be learned by only members of our side and cannot be learned by enemy. The wheel information interface 400 may be of any form and is not limited to the wheel form shown in FIG. 3, as long as predefined shortcut instruction information can be presented in the information interface. When a touch operation on the specified SMS message object 200 in the graphical user interface 100 is detected, a configuration parameter corresponding to the SMS message object 200 is invoked, and the information interface is obtained through rendering according to the configuration parameter. At least one preconfigured operation object is displayed in the information interface, for example, including shortcut instruction information such as: destroy the tower, fight dragons, go Baron, team fight, keep the highlands, go to the highlands, missing, back, and careful of bush.

Herein, it should be noted that, a UI shown in FIG. 3 obtained through rendering by a processor of a terminal device, which is specifically an image processor is only a specific example. UIs shown in FIG. 4 to FIG. 6 are other examples. Different personnel deployment scenarios in a game are used for description, for example, numbers of deployed persons of two parties are 1 to 1, 3 to 3, or 5 to 5, and sent shortcut instruction information is also different. In addition, in FIG. 4 to FIG. 6, sending of instruction information is triggered in two manners: by means of a touch operation and by means of a slide operation. FIG. 4 is a schematic diagram of triggering sending of instruction information by means of a touch operation, and FIG. 5 is a schematic diagram of triggering sending of instruction information by means of a slide operation. Details are not described herein, and details are provided subsequently.

Operation 303: Select a first object when detecting that a direction corresponding to the slide operation points to the first object.

Operation 304: Determine, when detecting that the slide operation changes to a slide release state from a slide state, that it is a release operation currently, and send voice and/or text information corresponding to the first object, to rapidly transmit instruction information that needs to be expressed.

By means of operation 303 and operation 304, the SMS message object 200 is slid and held. To send one piece of shortcut instruction information, the SMS message object 200 is slid to corresponding shortcut instruction information and then is released, so that corresponding shortcut instruction information in a text and/or voice form in the wheel information interface 400 shown in FIG. 3 can also be rapidly sent.

Specifically, as shown in FIG. 3, in this embodiment of the present disclosure, the specific virtual resource object is the SMS message object 200, and when a slide operation on the specified SMS message object 200 in the graphical user interface 100 is detected, the configuration parameter corresponding to the SMS message object 200 is invoked, the wheel information interface 400 is obtained through rendering according to the configuration parameter, and display of the wheel information interface 400 is triggered. At least one configured operation object is displayed in advance in the information interface, for example, including the shortcut instruction information such as: destroy the tower, fight dragons, go Baron, team fight, keep the highlands, go to the highlands, missing, back, and careful of bush. Therefore, to send one piece of shortcut instruction information, the current user touches corresponding shortcut instruction information such as "back" in the wheel information interface 400, a corresponding instruction information dialog box is 700, and the instruction information being "back" can be learned by only members of our side and cannot be learned by enemy, as shown in FIG. 5.

After the shortcut instruction information is sent, instruction information being "back" that is sent by the current user to any group member that belongs to the group of the current user is displayed in the graphical user interface 100, as shown in FIG. 5. FIG. 5 further includes an enlarged local view 600' corresponding to the mini map 600, layout of two parties in the game is displayed in the enlarged local view 600'. Currently, it is a deployment scenario in which numbers of deployed persons of two parties are 3 to 3, where the icons associated with labels "b11" and "b12" indicate a member of our side, and the icons associated with labels "a11" and "a12" indicate enemy.

In an implementation of this embodiment of the present disclosure, by means of operation 303 and operation 304, the SMS message object 200 is slid and held. To send one piece of shortcut instruction information, the SMS message object 200 is slid to corresponding shortcut instruction information and then is released. However, because the slide operation is incorrect and is not directed to the shortcut instruction information, a correction operation may be performed for the slide operation by means of the following embodiment, so that the corresponding shortcut instruction information in the text and/or voice form in the wheel information interface 400 shown in FIG. 3 can also be rapidly sent.

Operation 401 and operation 402 in this embodiment are the same as operation 301 and operation 302 in the previous embodiment, and details are not described herein again. This embodiment further includes:

Operation 403: Select a first object when detecting that a direction corresponding to the slide operation points to the first object.

Operation 404: Rotate the information interface when detecting that an indication direction of a slide trajectory corresponding to the slide operation is not directed to the first object within a preset time, to slightly adjust the first object in the information interface to be directed to the indication direction of the slide trajectory.

Operation 405: Determine, when detecting that the slide operation changes to a slide release state from a slide state, that it is a release operation currently, and send voice and/or text information corresponding to the first object, to rapidly transmit instruction information that needs to be expressed.

By means of operation 403 to operation 405, the SMS message object 200 is slid and held. To send one piece of shortcut instruction information, the SMS message object 200 is slid to corresponding shortcut instruction information and then is released; and if the slide operation is incorrect, corresponding shortcut instruction information in a text and/or voice form in the wheel information interface 400 shown in FIG. 3 can also be rapidly sent by means of a correction operation.

Specifically, as shown in FIG. 3, in this embodiment of the present disclosure, the specific virtual resource object is the SMS message object 200, and when a slide operation on the specified SMS message object 200 in the graphical user interface 100 is detected, the configuration parameter corresponding to the SMS message object 200 is invoked, the wheel information interface 400 is obtained through rendering according to the configuration parameter, and display of the wheel information interface 400 is triggered. At least one configured operation object is displayed in advance in the information interface, for example, including the shortcut instruction information such as: destroy the tower, fight dragons, go Baron, team fight, keep the highlands, go to the highlands, missing, back, and careful of bush. Therefore, to send one piece of shortcut instruction information, the current user touches corresponding shortcut instruction information such as "back" in the wheel information interface 400, a corresponding instruction information dialog box is 700, and the instruction information being "back" can be learned by only members of our side and cannot be learned by enemy, as shown in FIG. 6. Because the slide operation of the user is incorrect, and is not directed to corresponding shortcut instruction information such as "back" but is directed to the blank space between shortcut instruction information being "local gank" and shortcut instruction information being "back", an instruction cannot be sent in this case. In one manner, the user finds that it is incorrect and readjusts a slide direction, to be directed to corresponding shortcut instruction information such as "back". In another manner shown in FIG. 6, a correction direction is determined according to different distances by which a slide direction deviates from the current shortcut instruction information being "local gank" and the current shortcut instruction information being "back". For example, if the distance by which the slide direction deviates from the current shortcut instruction information being "local gank" is D1, a distance by which the slide direction deviates from the current shortcut instruction information being "back" is D2, and D2<D1, it is determined that a target object that the slide operation of the user is very likely to be directed to is the shortcut instruction information being "back", and therefore, the wheel information interface 400 is selected anticlockwise, which is preset, so that the shortcut instruction information being "back" is automatically directed to the slide indication direction, to send the shortcut instruction information being "back". Afterwards, the instruction information being "back" that the current user sends to any group member that belongs to the group of the current user is displayed in the graphical user interface 100, as shown in FIG. 6. FIG. 6 further includes an enlarged local view 600' corresponding to the mini map 600, and layout of two parties in the game is displayed in the enlarged local view 600'. Currently, it is a deployment scenario in which numbers of deployed persons of two parties are 1 to 1. It should be noted that, in this embodiment, a correction manner is not only applicable to an offline mode but also is applicable to a mode of interaction of multiple persons, for example, a scenario in which numbers of deployed persons of two parties are the same such as numbers of deployed persons are 3 to 3, numbers of deployed persons are 5 to 5, or numbers of deployed persons are 20 to 20; and a scenario in which numbers of deployed persons of two parties are different, such as numbers of deployed persons are 30 to 60, or numbers of deployed persons are 40 to 20, where the icon associated with label "b11" indicates a member of our side, and the icon associated with label "a11" indicates enemy.

In an implementation of this embodiment of the present disclosure, as shown in FIG. 3, when the information interface is in the wheel form, the at least one operation object (such as the shortcut instruction information) in the wheel information interface 400 is distributed in an annular shape, and is set relative to the specific virtual resource object (such as the SMS message object) as a center. The at least one operation object includes preset text information or icon information (which is not displayed in FIG. 3, an icon of corresponding text information may be set, and the icon instead of current text information is displayed in the wheel information interface 400).

In a process of implementing control based on manmachine interaction in the graphical user interface, creation of different groups by multiple users in a one-to-one, one-to-many, and many-to-many forms to run different interaction modes is supported. Therefore, different interaction results are obtained. The different interaction modes include a versus mode between multiple online users, and further include an offline versus mode without an Internet connection.

The versus mode between multiple users and the offline versus mode without an Internet connection are both applicable to described procedures and specific implementations in this disclosure, to complete sending of shortcut instruction information. For example, for the versus mode between multiple online users, the multiple users are grouped into different groups, each group includes at least one group member, and the different groups are marked as at least a first group (for example, our group) and a second group (for example, an opponent group). If there is only one person in our group, and there is also only one person in the opponent group, it is the "1 to 1" mode mentioned above. If there are only three persons in our group, and there are also three persons in the opponent group, it is the "3 to 3" mode mentioned above. If there are only five persons in our group, and there are also only five persons in the opponent group, it is the "5 to 5" mode mentioned above. Certainly, for the opponent group and our group, it is not necessarily to deploy a same number of persons, and different numbers of persons may be deployed, for example, a "3 to 5" mode. Our group and the opponent group can both see the UIs in FIG. 3 to FIG. 6. When a response is made to a touch or slide operation on a specific virtual resource object in a UI of any group member in a current user group (such as our group or the opponent group), the wheel information interface in FIG. 3 can be obtained through rendering, so that after one piece of shortcut instruction information is selected from the wheel information interface, voice and/or text instruction information corresponding to the shortcut instruction information is sent to another group member in the current user group. If the current user group is the first group, the shortcut instruction information is sent to the $i^{th}$ group member in the first group, where i is a positive integer greater than 1. Text may be displayed in a dialog box, a voice may be played, or a corresponding text or voice icon may be displayed, as long as the $i^{th}$ group member in the first group can see the current shortcut instruction information at a glance. A specific representation form is not limited.

The UIs shown in FIG. 4 to FIG. 6 are other examples different from FIG. 3. As also can be learned, after a response is made to a touch or slide operation of the user on a specified virtual image object, at least one operation object (such as shortcut instruction information) is shown in the wheel information interface. In addition, different personnel deployment scenarios in the game are used for description, for example, numbers of deployed persons of two parties are 1 to 1, 3 to 3, or 5 to 5, and sent shortcut instruction information is different.

Descriptions of a terminal, a server, and a computer storage medium are related in the following embodiment, for examples, effects, and the like that are not described, refer to different embodiments of the present disclosure, and details are not described herein.

Figure 9:
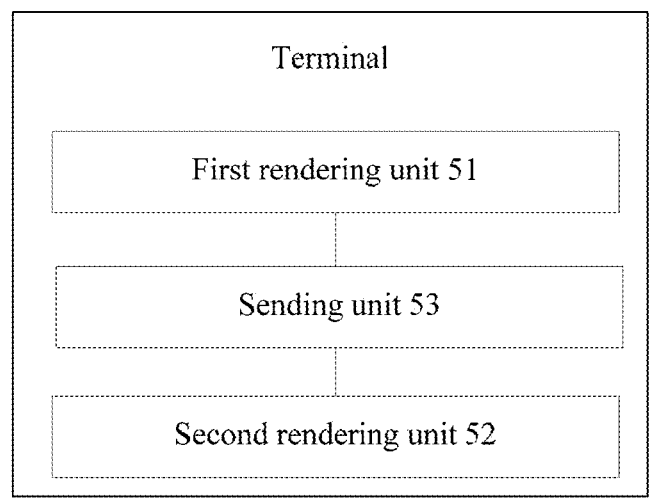
FIG. 9 is a schematic structural diagram according to some embodiments of the present disclosure.

This embodiment of the present disclosure provides a terminal. A software application is executed on a processor of the terminal and rendering is performed on a display of the terminal, to obtain a graphical user interface. The processor, the graphical user interface, and the software application are implemented in a game system. As shown in FIG. 9, the terminal further includes:

a first rendering unit 51, configured to perform rendering in the graphical user interface, to obtain at least one virtual resource object;

a second rendering unit 52, configured to: invoke, when a touch operation on a specific virtual resource object is detected, a configuration parameter corresponding to the specific virtual resource object, perform rendering according to the configuration parameter, to obtain an information interface including an information interface in a wheel form, and display at least one preconfigured operation object in the information interface; and a sending unit 53, configured to: select a first object in the at least one operation object by means of a touch operation or a slide operation, and send, when a release operation is detected, instruction information in a voice and/or text form that corresponds to the first object.

In an actual application of the embodiments, the virtual resource object is covered in various types of objects in the graphical user interface. For example, a user avatar icon for representing a user, an object for representing a building, a tree, tower defense, or the like in a background, an object for representing a status (such as a blood value or a vitality value) of the user, an object for representing a skill, equipment, or the like of the user, a direction button object for controlling a change of a location of the user, a rendering object used during skill release by the user, and the like shall all fall within the protection scope of the "virtual resource object" of the embodiments of the present disclosure.

Herein, the specific virtual resource object is an object that can respond to a specified trigger operation, such as a direction button object, in the graphical user interface, for controlling a change of a location of a user. When the user touches the direction button object and drags the direction button object to move to the left, a related user correspondingly displayed in the graphical user interface moves to the left. In this embodiment of the present disclosure, the specific virtual resource object is shown by an SMS message object 200 in FIG. 3. FIG. 3 further includes: a graphical user interface 100, a skill object 300, a wheel information interface 400, a function key object 500 for controlling a user to move and launch attach, and a mini map object 600 that can enable a current user to view deployment and layout of two parties in a large map shown in the graphical user interface. The current user sends instruction information being "keep the highlands" to any group member that belongs to a group of the current user, a corresponding instruction information dialog box is 700, and the instruction information being "keep the highlands" can be learned by only members of our side and cannot be learned by enemy. The wheel information interface 400 may be of any form and is not limited to the wheel form shown in FIG. 3, as long as predefined shortcut instruction information can be presented in the information interface. When a touch operation on the specified SMS message object 200 in the graphical user interface 100 is detected, a configuration parameter corresponding to the SMS message object 200 is invoked, and the information interface is obtained through rendering according to the configuration parameter. At least one preconfigured operation object is displayed in the information interface, for example, including shortcut instruction information such as: destroy the tower, fight dragons, go Baron, team fight, keep the highlands, go to the highlands, missing, back, and careful of bush.

Herein, it should be noted that, a UI shown in FIG. 3 obtained through rendering by a processor of a terminal device, which is specifically an image processor (a first renderer corresponding to the first rendering unit and a second renderer corresponding to the second rendering unit) is only a specific example. UN shown in FIG. 4 to FIG. 6 are other examples. Different personnel deployment scenarios in a game are used for description, for example, numbers of deployed persons of two parties are 1 to 1, 3 to 3, or 5 to 5, and shortcut instruction information sent by the sending unit is also different. In addition, in FIG. 4 to FIG. 6, sending of instruction information is triggered in two manners: by means of a touch operation and by means of a slide operation. FIG. 4 is a schematic diagram of triggering sending of instruction information by means of a touch operation, FIG. 5 is a schematic diagram of triggering sending of instruction information by means of a slide operation, and FIG. 6 is a schematic diagram of triggering sending of instruction information by means of a slide operation and a correction manner. Details are not described herein, and details are provided subsequently.

In an implementation of this embodiment of the present disclosure, a first scenario in which instruction information is triggered by means of a touch operation is as follows: As shown in FIG. 3, in this embodiment of the present disclosure, the specific virtual resource object is the SMS message object 200, and when the touch operation on the specified SMS message object 200 in the graphical user interface 100 is detected, the configuration parameter corresponding to the SMS message object 200 is invoked, the wheel information interface 400 is obtained through rendering according to the configuration parameter, and display of the wheel information interface 400 is triggered. At least one configured operation object is displayed in advance in the information interface, for example, including the shortcut instruction information such as: destroy the tower, fight dragons, go Baron, team fight, keep the highlands, go to the highlands, missing, back, and careful of bush. Therefore, to send one piece of shortcut instruction information, the current user touches corresponding shortcut instruction information such as "go Baron" in the wheel information interface 400, a corresponding instruction information dialog box is 700, and the instruction information being "go Baron" can be learned by only members of our side and cannot be learned by enemy, as shown in FIG. 4.

After the shortcut instruction information is sent, instruction information being "go Baron" that is sent by the current user to any group member that belongs to the group of the current user is displayed in the graphical user interface 100, as shown in FIG. 4. FIG. 4 further includes an enlarged local view 600' corresponding to the mini map 600, layout of two parties in the game is displayed in the enlarged local view 600'. Currently, it is a deployment scenario in which numbers of deployed persons of two parties are 5 to 5, where the icons associated with labels "b11", "b12", and "b13" indicate a member of our side, and the icons associated with labels "a11" and "a12" indicate enemy.

In an implementation of this embodiment of the present disclosure, a second scenario in which instruction information is triggered by means of a slide operation is as follows: As shown in FIG. 3, in this embodiment of the present disclosure, the specific virtual resource object is the SMS message object 200, and when a slide operation on the specified SMS message object 200 in the graphical user interface 100 is detected, the configuration parameter corresponding to the SMS message object 200 is invoked, the wheel information interface 400 is obtained through rendering according to the configuration parameter, and display of the wheel information interface 400 is triggered. At least one configured operation object is displayed in advance in the information interface, for example, including the shortcut instruction information such as: destroy the tower, fight dragons, go Baron, team fight, keep the highlands, go to the highlands, missing, back, and careful of bush. Therefore, to send one piece of shortcut instruction information, the current user touches corresponding shortcut instruction information such as "back" in the wheel information interface 400, a corresponding instruction information dialog box is 700, and the instruction information being "back" can be learned by only members of our side and cannot be learned by enemy, as shown in FIG. 5.

After the shortcut instruction information is sent, instruction information being "back" that is sent by the current user to any group member that belongs to the group of the current user is displayed in the graphical user interface 100, as shown in FIG. 5. FIG. 5 further includes an enlarged local view 600' corresponding to the mini map 600, layout of two parties in the game is displayed in the enlarged local view 600'. Currently, it is a deployment scenario in which numbers of deployed persons of two parties are 3 to 3, where the icons associated with labels "b11" and "b12" indicate a member of our side, and the icons associated with labels "a11" and "a12" indicate enemy.

In an implementation of this embodiment of the present disclosure, a third scenario in which instruction information is triggered by means of a slide operation and a correction operation is as follows:

As shown in FIG. 3, in this embodiment of the present disclosure, the specific virtual resource object is the SMS message object 200, and when a slide operation on the specified SMS message object 200 in the graphical user interface 100 is detected, the configuration parameter corresponding to the SMS message object 200 is invoked, the wheel information interface 400 is obtained through rendering according to the configuration parameter, and display of the wheel information interface 400 is triggered. At least one configured operation object is displayed in advance in the information interface, for example, including the shortcut instruction information such as: destroy the tower, fight dragons, go Baron, team fight, keep the highlands, go to the highlands, missing, back, and careful of bush. Therefore, to send one piece of shortcut instruction information, the current user touches corresponding shortcut instruction information such as "back" in the wheel information interface 400, a corresponding instruction information dialog box is 700, and the instruction information being "back" can be learned by only members of our side and cannot be learned by enemy, as shown in FIG. 6. Because the slide operation of the user is incorrect, and is not directed to corresponding shortcut instruction information such as "back" but is directed to the blank space between shortcut instruction information being "local gank" and shortcut instruction information being "back", an instruction cannot be sent in this case. In one manner, the user finds that it is incorrect and readjusts a slide direction, to be directed to corresponding shortcut instruction information such as "back". In another manner shown in FIG. 6, a correction direction is determined according to different distances by which a slide direction deviates from the current shortcut instruction information being "local gank" and the current shortcut instruction information being "back". For example, if the distance by which the slide direction deviates from the current shortcut instruction information being "local gank" is D1, a distance by which the slide direction deviates from the current shortcut instruction information being "back" is D2, and D2<D1, it is determined that a target object that the slide operation of the user is very likely to be directed to is the shortcut instruction information being "back", and therefore, the wheel information interface 400 is selected anticlockwise, which is preset, so that the shortcut instruction information being "back" is automatically directed to the slide indication direction, to send the shortcut instruction information being "back". Afterwards, the instruction information being "back" that the current user sends to any group member that belongs to the group of the current user is displayed in the graphical user interface 100, as shown in FIG. 6. FIG. 6 further includes an enlarged local view 600' corresponding to the mini map 600, and layout of two parties in the game is displayed in the enlarged local view 600'. Currently, it is a deployment scenario in which numbers of deployed persons of two parties are 1 to 1. It should be noted that, in this embodiment, a correction manner is not only applicable to an offline mode but also is applicable to a mode of interaction of multiple persons, for example, a scenario in which numbers of deployed persons of two parties are the same such as numbers of deployed persons are 3 to 3, numbers of deployed persons are 5 to 5, or numbers of deployed persons are 20 to 20; and a scenario in which numbers of deployed persons of two parties are different, such as numbers of deployed persons are 30 to 60, or numbers of deployed persons are 40 to 20, where the icon associated with label "b11" indicates a member of our side, and the icon associated with label "a11" indicates enemy.

In an implementation of this embodiment of the present disclosure, as shown in FIG. 3, when the information interface is in the wheel form, the at least one operation object (such as the shortcut instruction information) in the wheel information interface 400 is distributed in an annular shape, and is set relative to the specific virtual resource object (such as the SMS message object) as a center. The at least one operation object includes preset text information or icon information (which is not displayed in FIG. 3, an icon of corresponding text information may be set, and the icon instead of current text information is displayed in the wheel information interface 400).

In an implementation of this embodiment of the present disclosure, when the information interface is in the wheel form, the at least one operation object is distributed in an annular shape and is set relative to the specific virtual resource object as a center; and the at least one operation object includes preset text information or icon information.

In an implementation of this embodiment of the present disclosure, the sending unit further includes: a first detection subunit, configured to select the first object when detecting that the touch operation is applied to the first object; and a second detection subunit, configured to: determine, when detecting that the touch operation changes to a touch release state from a touch state, that it is the release operation currently, and send voice and/or text information corresponding to the first object, to rapidly transmit the instruction information that needs to be expressed.

In an implementation of this embodiment of the present disclosure, the sending unit further includes: a first detection subunit, configured to select the first object when detecting that a direction corresponding to the slide operation points to the first object; and a second detection subunit, configured to: determine, when detecting that the slide operation changes to a slide release state from a slide state, that it is the release operation currently, and send voice and/or text information corresponding to the first object, to rapidly transmit the instruction information that needs to be expressed.

In an implementation of this embodiment of the present disclosure, the sending unit further includes: a first detection subunit, configured to select the first object when detecting that a direction corresponding to the slide operation points to the first object; a second detection subunit, configured to: rotate the information interface when detecting that an indication direction of a slide trajectory corresponding to the slide operation is not directed to the first object within a preset time, to slightly adjust the first object in the information interface to be directed to the indication direction of the slide trajectory; and a third detection subunit, configured to: determine, when detecting that the slide operation changes to a slide release state from a slide state, that it is the release operation currently, and send voice and/or text information corresponding to the first object, to rapidly transmit the instruction information that needs to be expressed.

Figure 10:
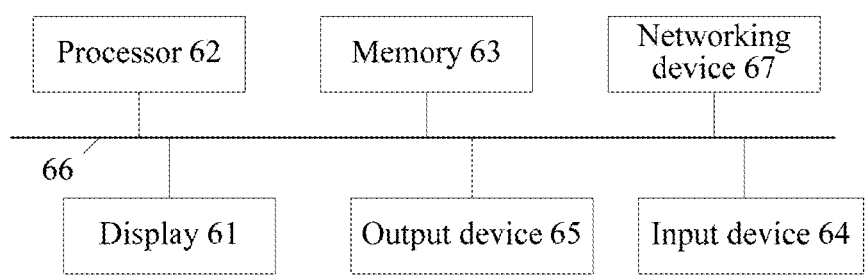
FIG. 10 is a schematic structural diagram of hardware entities according to some embodiments of the present disclosure.

This embodiment of the present disclosure provides a terminal. As shown in FIG. 10, the terminal includes: a display 61 and a processor 62. The display 61 is configured to: execute a software application on the processor of the terminal and then perform rendering on the software application, to obtain a graphical user interface. The graphical user interface is configured to facilitate control processing in man-machine interaction. The processor 62 is configured to perform the information processing method in the embodiments of the present disclosure. The processor, the graphical user interface, and the software application are implemented in a game system.

In this embodiment, the terminal further includes: a memory 63, an input device 64 (for example, a peripheral device such as a collection device including a camera, a microphone, and a headset; a mouse, a joystick, or a desktop computer keyboard; or a physical keyboard or a touchscreen on a notebook computer or a tablet computer), an output device 65 (for example, an audio output device or a video output device including a speaker, a headset, and the like), a bus 66, and a networking device 67. The processor 62, the memory 63, the input device 64, the display 61, and the networking device 67 are connected by using the bus 66, and the bus 66 is used for data transmission and communication between the processor 62, the memory 63, the display 61, and the networking device 67.

The input device 64 is mainly configured to obtain an input operation of a user, and the input device 64 may vary with the terminal. For example, when the terminal is a PC, the input device 64 may be an input device such as a mouse or a keyboard; when the terminal is portable device such as a smartphone or a tablet computer, the input device 64 may be a touchscreen. The networking device 67 is used by multiple terminals and a server to connect and upload and download data by using a network, and used by multiple terminals to connect and perform data transmission by using a network.

The server may be formed by a cluster system, and to implement functions of various units, the functions may be combined or functions of the units are separately provided in an electronic device. Either the terminal or the server at least includes a database for storing data and a processor for data processing, or includes a storage medium disposed in the server or a storage medium that is disposed separately. For the processor for data processing, during processing, a microprocessor, a central processing unit (CPU), a digital signal processor (DSP), or a field programmable gate array (FPGA) may be used for implementation. The storage medium includes an operation instruction, the operation instruction may be computer executable code, and operations in the procedure of the information processing method in the embodiments of the present disclosure are implemented by using the operation instruction.

This embodiment of the present disclosure provides a computer storage medium. A computer executable instruction is stored in the computer storage medium, and the computer executable instruction is configured to perform the information processing method in the embodiments of the present disclosure.

This embodiment of the present disclosure is described below by using an actual application scenario as an example.

This application scenario is related to Multiplayer Online Battle Arena Games (MOBA). In MOBA, related terms are as follows: 1) UI layer, that is, an icon in a graphical user interface; 2) skill indicator: a special effect, a halo, or an operation used to supplement skill release; 3) lens, which may be understood as a camera in the game; and 4) mini map: a scaled-down version of a large map, which may be understood as a radar map, where information and locations of two parties are displayed in the map.

In this application scenario, in current game products of the phone game MOBA, processing of sending a message to notify a teammate is usually typing in a dialog box or directly sending a voice. It is troublesome and laborious to type on a mobile phone, and usually, a situation has changed before the typing is done. In voice chat, a voice recording button needs to be held to record a voice message, and it is also time-consuming, traffic may be generated, and a player may not hear it clearly in a noisy place. Therefore, in such a manner of interaction by typing text, first, a player needs to take a lot of time in typing, and usually cannot perform another operation during typing. Consequently, something may be directly missed in the game, it is very time-consuming, and even, it needs a lot of text content to explain. In a manner of interaction by using a voice, for a voice in a battle in an existing mobile phone, usually, interaction is performed by using recordings, a user needs to hold a speaking button to record and send the recording by releasing. This case is similar to chat by typing text, traffic needs to be consumed to send a voice. For a sent voice, some voices may be not understood by a person that hears the voices, and a voice is easily affected by the surrounding environment. The manner is not frequently used in an actual use process.

Figure 11:
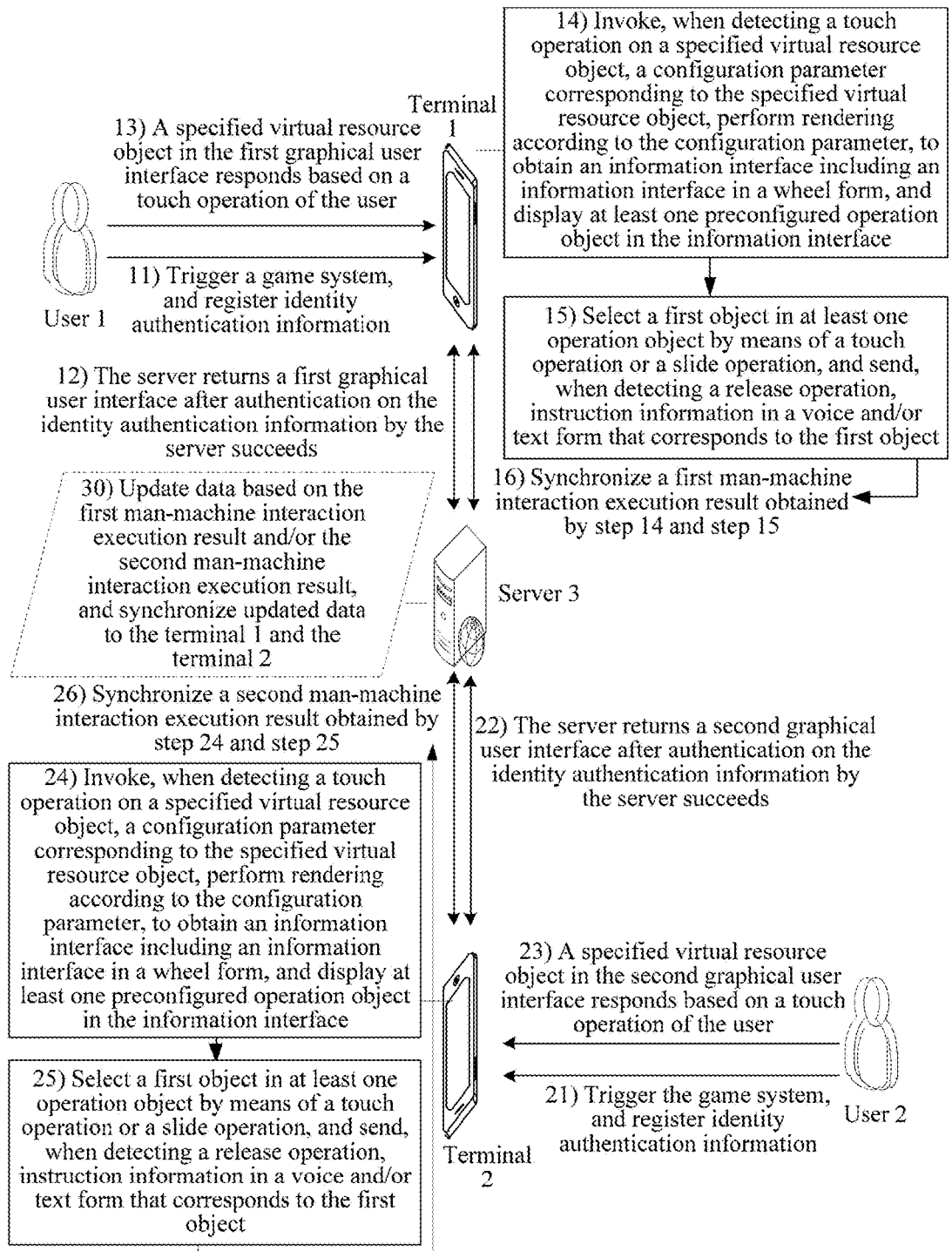
FIG. 11 is a schematic flowchart of implementation of a specific application scenario to which an embodiment of the present disclosure is applied.
Figure 12:
FIG. 12 illustrates a table between content of shortcut information and corresponding icon of the shortcut information.
Figure 12:
Figure 12:
Figure 12:
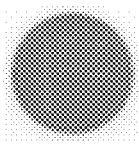
Figure 12:
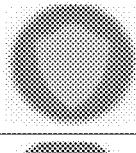
Figure 12:
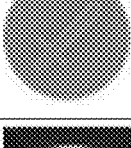
Figure 12:
Figure 12:
Figure 12:
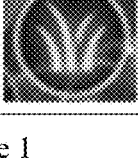

In this application scenario, by means of this embodiment of the present disclosure, a problem of incorrect expression in a frequently used tactic may be resolved by means of a convenient operation on a mobile phone, to rapidly express a frequently used command in the MOBA, without typing in a dialog box laboriously, so as to save a time and gain the preemptive opportunity for a battle. A specific interaction procedure is shown in FIG. 11. User operations presented in the interaction procedure and UI presentation include: a user defines different voice and interface presentation form by setting default shortcut options; a wheel appears after a player holds a corresponding voice icon, where content on the wheel is predefined; and a corresponding shortcut voice is selected by sliding in a corresponding direction, and content of the corresponding shortcut voice appears in an interface after releasing. The entire procedure includes: holding a shortcut voice—sliding to a corresponding voice direction—releasing—sending a corresponding instruction (shortcut instruction information in a voice and/or text form). After the instruction is sent, corresponding information appears in a mini map at the upper left corner in a graphical user interface. Correspondences are shown in Table 1 shown in FIG. 12 (corresponding to the UI shown in FIG. 3, current shortcut instruction information is indicated by "keep the highlands" in a bold type in Table 1). Most information to be transmitted in game can be well expressed by using the correspondences in the following Table 1. Certainly, information update operations such as adding, deletion, and modification may be performed according to a user requirement, and are not limited to descriptions of examples in Table 1. As can be learned, information that needs to be expressed can be rapidly transmitted in a form of an icon+a voice.

FIG. 11 is a schematic flowchart of specific interaction in an information processing method in this application scenario. As shown in FIG. 11, in this application scenario, a terminal 1, a terminal 2, and a server are included. The user 1 performs triggering and control by using the terminal 1, and the user 2 performs triggering and control by using the terminal 2; and the method includes the following operations:

For the user 1, operation 11 to operation 16 are included.

Operation 11: The user 1 triggers a game system by using the terminal 1, and registers identity authentication information, where the identity authentication information may be a user name and a password.

Operation 12: The terminal 1 transmits the obtained identity authentication information to the server 3, and the server 3 performs identity authentication, and returns a first graphical user interface to the terminal 1 after the identity authentication succeeds, where the first graphical user interface includes a virtual resource object.

Operation 13: A specific virtual resource object (such as an SMS message object in FIG. 3) can respond based on a touch operation of the user 1, and performs a series of virtual operations in operation 14 to operation 16.

Operation 14: Invoke, when detecting a touch operation on a specific virtual resource object, a configuration parameter corresponding to the specific virtual resource object, perform rendering according to the configuration parameter, to obtain an information interface including an information interface in a wheel form, and display at least one preconfigured operation object in the information interface.

Operation 15: Select a first object in the at least one operation object by means of a touch operation or a slide operation, and send, when detecting a release operation, instruction information in a voice and/or text form that corresponds to the first object.

Operation 16: Synchronize an execution result obtained by performing operation 14 and operation 15 to the server, or instantly transfer the execution result to the terminal 2 by using the server, or directly forward the execution result to the terminal 2, so that the user 2 that logs in to the game system by using the terminal 2 can respond to the virtual operation of the user 1, so as to implement interaction between multiple terminals. In this application scenario, only interaction between two terminals is used as an example, and during an actual operation, interaction between multiple terminals may be not limited to interaction between the two terminals in this example.

For the user 2, operation 21 to operation 26 are included for the user 1.

Operation 21: The user 2 triggers the game system by using the terminal 2, and registers identity authentication information, where the identity authentication information may be a user name and a password.

Operation 22: The terminal 1 transmits the obtained identity authentication information to the server 3, and the server 3 performs identity authentication, and returns a second graphical user interface to the terminal 2 after the identity authentication succeeds, where the second graphical user interface includes a virtual resource object.

Operation 23: A specific virtual resource object (such as an SMS message object in FIG. 3) can respond based on a touch operation of the user 2, and performs a series of virtual operations in operation 24 to operation 26.

Operation 24: Invoke, when detecting a touch operation on a specific virtual resource object, a configuration parameter corresponding to the specific virtual resource object, perform rendering according to the configuration parameter, to obtain an information interface including an information interface in a wheel form, and display at least one preconfigured operation object in the information interface.

Operation 25: Select a first object in the at least one operation object by means of a touch operation or a slide operation, and send, when detecting a release operation, instruction information in a voice and/or text form that corresponds to the first object.

Operation 26: Synchronize an execution result obtained by performing operation 24 and operation 25 to the server, or instantly transfer the execution result to the terminal 1 by using the server, or directly forward the execution result to the terminal 1, so that the user 1 that logs in to the game system by using the terminal 1 can respond to the virtual operation of the user 2, so as to implement interaction between multiple terminals. In this application scenario, only interaction between two terminals is used as an example, and during an actual operation, interaction between multiple terminals may be not limited to interaction between the two terminals in this example.

Operation 30: An optional operation: Synchronize or transfer, after receiving a first man-machine interaction execution result obtained by operation 14 to operation 16 and/or a second interaction execution result obtained by operation 24 to operation 26, the first man-machine interaction execution result and/or the second interaction execution result to corresponding terminals.

In the several embodiments provided in this application, it should be understood that the disclosed device and method may be implemented in other manners. The described device embodiments are merely examples. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections between constituent parts may be implemented through some interfaces. The indirect couplings or communication connections between the devices or units may be implemented in electronic, mechanic, or other forms.

The units described as separate parts may or may not be physically separate, and parts displayed as units may or may not be physical units, may be located in one location, or may be distributed on multiple network units. Some or all of the units may be selected according to actual needs to achieve the objectives of the solutions of the embodiments.

In addition, the functional units in the embodiments of the present disclosure may all be integrated into one processing unit, or each of the units may exist separately, or two or more units are integrated into one unit, and the integrated unit may be implemented in a form of hardware, or may be implemented in a form of hardware in addition to a software functional unit.

A person of ordinary skill in the art may understand that all or some of the operations of the method embodiments may be implemented by a program instructing relevant hardware. The program may be stored in a computer-readable storage medium. When the program runs, the operations of the method embodiments are performed. The foregoing storage medium includes: any medium that can store program code, such as a portable storage device, a read-only memory (ROM), a random access memory (RAM), a magnetic disk, or an optical disc.

Alternatively, in the present disclosure, when the integrated unit is implemented in a form of a software functional module and sold or used as an independent product, the integrated unit may be stored in a computer-readable storage medium. Based on such an understanding, the technical solutions of the embodiments of the present disclosure essentially, or the part contributing to the existing technology may be implemented in a form of a software product. The computer software product is stored in a storage medium, and includes several instructions for instructing a computer device (which may be a personal computer, a server, or a network device) to perform all or some of the methods described in the embodiments of the present disclosure. The foregoing storage medium includes: any medium that can store program code, such as a portable storage device, a ROM, a RAM, a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

INDUSTRIAL APPLICABILITY

By means of the embodiments of the present disclosure, when a touch operation on a specific virtual resource object is detected, a configuration parameter corresponding to the specific virtual resource object may be invoked, rendering is performed according to the configuration parameter, to obtain an information interface including an information interface in a wheel form, a first object in at least one operation object in the information interface is selected by means of a touch operation or a slide operation, and instruction information in a voice and/or text form that corresponds to the first object is sent when a release operation is detected. Because preset instruction information is sent by means of man-machine interaction, and to send instruction information, it does not need to first take time to edit information content additionally, information can be sent in real time and rapidly, thereby meeting requirements for real-time performance and rapidness of information exchange.

What is claimed is:

1. An information processing method performed at a terminal having one or more processors and memory storing one or more programs to be executed by the one or more processors, the method comprising:

rendering a graphical user interface of an online game system, the graphical user interface including two or more virtual characters and at least one virtual resource object;

detecting a touch operation on the least one virtual resource object;

identifying a configuration parameter corresponding to the least one virtual resource object, the configuration parameter including multiple preconfigured operation objects, each preconfigured operation object having an associated message;

rendering, within the graphical user interface, an information interface with the multiple preconfigured operation objects, the information interface being located near the least one virtual resource object;

visually highlighting, within the information interface, one of the multiple preconfigured operation objects as a recommended operation object based on: (i) locations of the two or more virtual characters in the graphical user interface, and (ii) relationships of the two or more virtual characters with one another;

detecting user selection of the recommended operation object highlighted in the information interface; and transmitting a message associated with the user-selected recommended operation object to terminals corresponding to at least some of the two or more virtual characters of the online game system.

2. The method according to claim 1, further comprising: transiently displaying the message near the center of the graphical user interface for a predefined time period.

3. The method according to claim 1, wherein the operation of transmitting a message associated with the user-selected recommended operation object to terminals corresponding to at least some of the two or more virtual characters of the online game system further comprises:

transmitting a text version of the message to a first terminal according to its user configuration at the online game system; and transmitting a voice version of the message to a second terminal according to its user configuration at the online game system.

4. The method according to claim 1, wherein the information interface is in a wheel form, with the least one virtual resource object located at a center of the wheel and the preconfigured operation objects distributed in an annular shape around the wheel center, each operation object being represented by a respective text message.

5. The method according to claim 4, wherein the information interface includes a dial pointing to the user-selected recommended operation object.

6. A terminal comprising one or more processors, memory and one or more programs stored in the memory that, when executed by the one or more processors, cause the terminal to perform a plurality of operations including:

rendering a graphical user interface of an online game system, the graphical user interface including two or more virtual characters and at least one virtual resource object;

detecting a touch operation on the least one virtual resource object;

identifying a configuration parameter corresponding to the least one virtual resource object, the configuration parameter including multiple preconfigured operation objects, each preconfigured operation object having an associated message;

rendering, within the graphical user interface, an information interface with the multiple preconfigured operation objects, the information interface being located near the least one virtual resource object;

visually highlighting, within the information interface, one of the multiple preconfigured operation objects as a recommended operation object based on: (i) locations of the two or more virtual characters in the graphical user interface, and (ii) relationships of the two or more virtual characters with one another;

detecting user selection of the recommended operation object highlighted in the information interface; and transmitting a message associated with the user-selected recommended operation object to terminals corresponding to at least some of the two or more virtual characters of the online game system.

7. The terminal according to claim 6, wherein the plurality of operations includes:

transiently displaying the message near the center of the graphical user interface for a predefined time period.

8. The terminal according to claim 6, wherein the operation of transmitting a message associated with the user-selected recommended operation object to terminals corresponding to at least some of the two or more virtual characters of the online game system further comprises:

transmitting a text version of the message to a first terminal according to its user configuration at the online game system; and transmitting a voice version of the message to a second terminal according to its user configuration at the online game system.

9. The terminal according to claim 6, wherein the information interface is in a wheel form, with the least one virtual resource object located at a center of the wheel and the preconfigured operation objects distributed in an annular shape around the wheel center, each operation object being represented by a respective text message.

10. The terminal according to claim 9, wherein the information interface includes a dial pointing to the user-selected recommended operation object.

11. A non-transitory computer readable storage medium storing one or more programs, wherein the one or more programs are configured to, when executed by one or more processors of a terminal, cause the terminal to perform a plurality of operations including:

rendering a graphical user interface of an online game system, the graphical user interface including two or more virtual characters and at least one virtual resource object;

detecting a touch operation on the least one virtual resource object;

identifying a configuration parameter corresponding to the least one virtual resource object, the configuration parameter including multiple preconfigured operation objects, each preconfigured operation object having an associated message;

rendering, within the graphical user interface, an information interface with the multiple preconfigured operation objects, the information interface being located near the least one virtual resource object;

visually highlighting, within the information interface, one of the multiple preconfigured operation objects as a recommended operation object based on: (i) locations of the two or more virtual characters in the graphical user interface, and (ii) relationships of the two or more virtual characters with one another;

detecting user selection of the recommended operation object highlighted in the information interface; and transmitting a message associated with the user-selected recommended operation object to terminals corresponding to at least some of the two or more virtual characters of the online game system.

12. The non-transitory computer readable storage medium according to claim 11, wherein the plurality of operations includes:

transiently displaying the message near the center of the graphical user interface for a predefined time period.

13. The non-transitory computer readable storage medium according to claim 11, wherein the operation of transmitting a message associated with the user-selected recommended operation object to terminals corresponding to at least some of the two or more virtual characters of the online game system further comprises:

transmitting a text version of the message to a first terminal according to its user configuration at the online game system; and transmitting a voice version of the message to a second terminal according to its user configuration at the online game system.

14. The non-transitory computer readable storage medium according to claim 11, wherein the information interface is in a wheel form, with the least one virtual resource object located at a center of the wheel and the preconfigured operation objects distributed in an annular shape around the wheel center, each operation object being represented by a respective text message.

15. The non-transitory computer readable storage medium according to claim 14, wherein the information interface includes a dial pointing to the user-selected recommended operation object.

* * * * *